(12) United States Patent
Yoshizumi et al.

(10) Patent No.: US 9,989,698 B2
(45) Date of Patent: Jun. 5, 2018

(54) LIGHT PIPE AND ELECTRONIC APPARATUS USING THE SAME

(71) Applicant: FUJITSU LIMITED, Kawasaki-shi, Kanagawa (JP)

(72) Inventors: Takahisa Yoshizumi, Fukuoka (JP); Chiyu Ishizuka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 28 days.

(21) Appl. No.: 14/528,237

(22) Filed: Oct. 30, 2014

(65) Prior Publication Data

US 2015/0153019 A1  Jun. 4, 2015

(30) Foreign Application Priority Data

Nov. 29, 2013  (JP) .................. 2013-248327

(51) Int. Cl.
  *F21V 7/04*  (2006.01)
  *F21V 8/00*  (2006.01)

(52) U.S. Cl.
  CPC ......... *G02B 6/0096* (2013.01); *G02B 6/0008* (2013.01); *G02B 6/0075* (2013.01)

(58) Field of Classification Search
  CPC .. G02B 6/0005; G02B 6/0066; G02B 6/0073; G02B 6/0096; G02B 6/0008; G02B 6/0075; G02B 6/0078
  USPC .......................... 362/555, 554, 582; 439/490
  See application file for complete search history.

(56) References Cited

U.S. PATENT DOCUMENTS 5,812,730 A * 9/1998 Snyder .................... G02B 6/26
                                                                   385/147
2006/0275004 A1  12/2006 Fujii et al.
2011/0141732 A1   6/2011 Shiroishi et al.

FOREIGN PATENT DOCUMENTS

| JP | 55-155252    | 11/1981 |
|----|--------------|---------|
| JP | 61-151684    | 7/1986  |
| JP | 7-29653 U    | 7/1995  |
| JP | 2006-337748  | 12/2006 |
| JP | 2008-96745   | 4/2008  |
| JP | 2008-140550  | 6/2008  |
| JP | 2011-129536  | 6/2011  |
| JP | 2011-221142  | 11/2011 |
| WO | 2008/065906  | 6/2008  |

OTHER PUBLICATIONS

Japanese Office Action dated Jul. 11, 2017 from Japanese Patent Application No. 2013-248327, 7 pages.

* cited by examiner

*Primary Examiner* — Elmito Breval
*Assistant Examiner* — Omar Rojas Cadima
(74) *Attorney, Agent, or Firm* — Staas & Halsey LLP

(57) ABSTRACT

A light pipe includes a plurality of light guide units, and a connection unit that integrally connects the plurality of light guide units, the connection unit including a light interference suppression hole formed between the light guide units adjacent to each other, the light interference suppression hole including at least one surface that satisfies a total reflection condition of light entering the light interference suppression hole from the connection unit.

16 Claims, 7 Drawing Sheets

LIGHT PIPE AND ELECTRONIC APPARATUS USING THE SAME

CROSS-REFERENCE TO RELATED APPLICATION

This application is based upon and claims the benefit of priority of the prior Japanese Patent Application No. 2013-248327, filed on Nov. 29, 2013, the entire contents of which are incorporated herein by reference.

FIELD

The embodiment discussed herein is related to a light pipe and an electronic apparatus using the light pipe.

BACKGROUND

An electronic apparatus such as a server and a gateway device has an indicator lamp as an indicator that indicates an operating state. As illustrated in FIG. 1A, an indicator lamp 115 is generally arranged in a front surface $111_{front}$ of a housing 111 and light from a light emitting element (LED) 103 on a substrate (printed circuit board) 102 in the housing 111 is guided to a light emitting window 112 formed in the housing 111 by using an optical component such as a light pipe 120.

When a large number of indicator lamps 115 are arranged in the front surface $111_{front}$ of the housing 111, a plurality of LEDs 103 are arranged on of the substrate 102 and light from the LEDs 3 is guided to light emitting portions 123 by using the light pipe 120 in which a plurality of light guide units 121 are connected by connection units 122.

As illustrated in FIG. 1B, when the light guide units 121 are connected together by the connection units 122, there is a problem that the light of the LED 103 leaks to an adjacent light guide unit 121 through the connection unit 122 and the indicator lamp 115 that is not intended to be lit is lit.

In an electronic apparatus that is placed on a table and an electronic apparatus that is attached to a wall surface, it is considered that the indicator lamps 115 are provided not only on the front surface $111_{front}$ of the housing 111, but also on the top surface $111_{top}$. In this case, the light emission intensity of the LED 103 is high, so that the problem of light interference between the light guide units 121 adjacent to each other is more noticeable.

When the light guide units 121 are not connected together by the connection units 122 and the light guide unit 121 is arranged for each LED 103, the number of components increases, and handling and assembling of the light guide units 121 are troublesome.

To suppress the leakage of light to an adjacent light guide lens by an integrated light pipe, a configuration is known in which a light shielding rib is arranged (for example, see Japanese Examined Utility Model Registration Application Publication No. 07-29653) and a configuration is known in which the connection unit is formed into a shape in which a squared U-shape, a U-shape, a V-shape, or the like is repeated so that the connection unit detours around a plurality of light guide lenses (for example, see Japanese Laid-open Patent Publication No. 2008-96745). Further, a configuration is proposed in which the light leakage of the LED is reduced by arranging a light shielding plate between a plurality of light guide lenses and arranging a connection unit that continuously gets over the light shielding plates (for example, see Japanese Patent No. 5060628).

SUMMARY

According to an aspect of the invention, a light pipe includes a plurality of light guide units, and a connection unit that integrally connects the plurality of light guide units, the connection unit including a light interference suppression hole formed between the light guide units adjacent to each other, the light interference suppression hole including at least one surface that satisfies a total reflection condition of light entering the light interference suppression hole from the connection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When the light shielding rib or the light shielding plate described in the background is used, straight-traveling light may be shielded, however, light leakage of reflected light and light that detours by light diffraction is difficult to be deterred. Even when the connection unit that detours around the light guide lenses or the connection unit that gets over the light shielding plates is arranged, leakage light reaches an adjacent light guide lens by reflected light.

Therefore, it is desired to provide a light pipe that may be easily handled and may suppress the light leakage through the connection unit and an electronic apparatus using the light pipe.

Figure 1A:
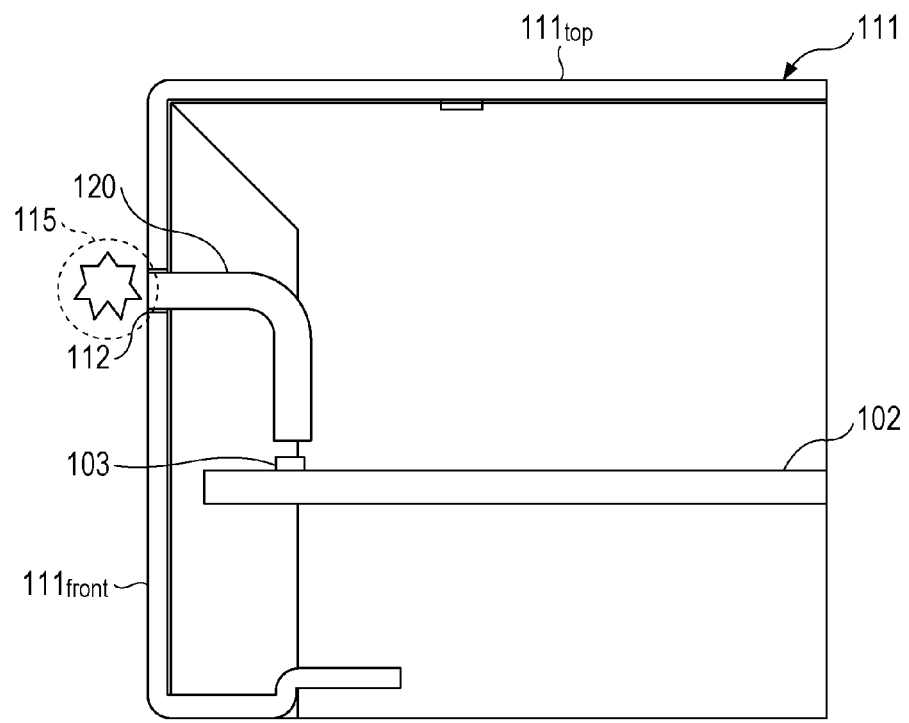
FIGS. 1A and 1B are diagrams for explaining a problem occurring in a light pipe in which a plurality of light guide units are connected.
Figure 1B:
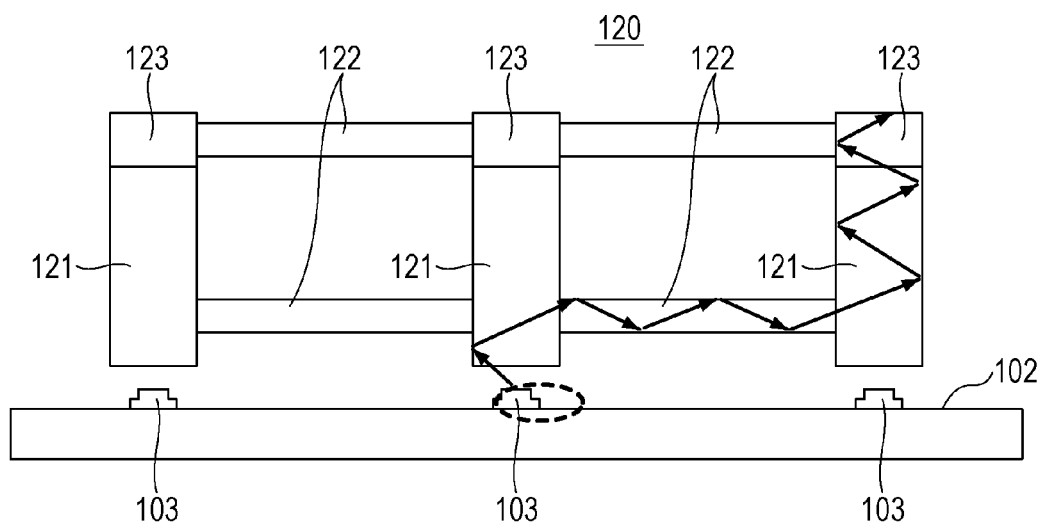
Figure 2A:
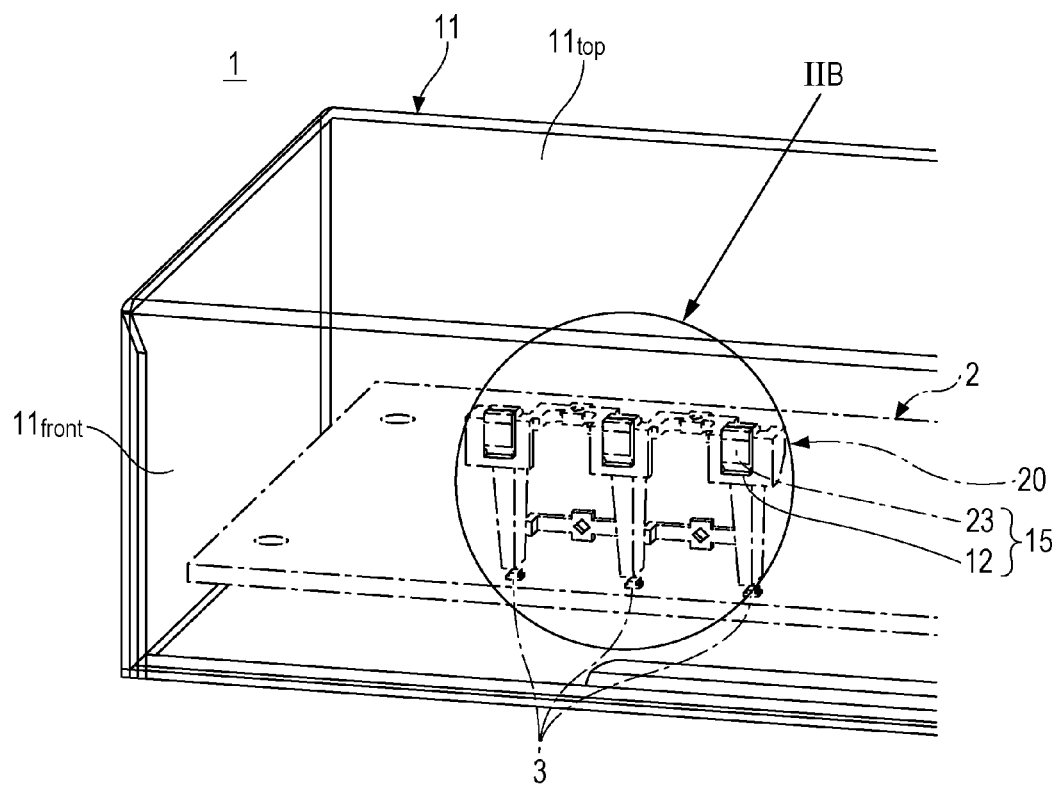
FIGS. 2A and 2B are schematic diagrams of a light pipe used in an electronic apparatus of an embodiment.
Figure 2B:
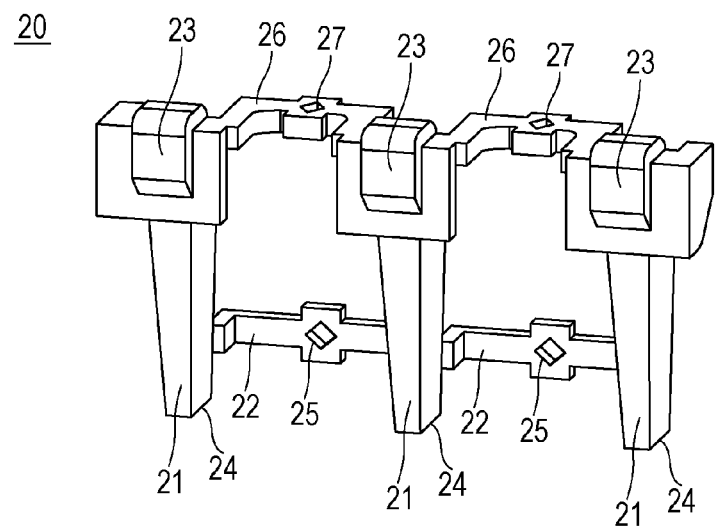

FIGS. 2A and 2B are schematic diagrams of a light pipe 20 used in an electronic apparatus 1 of an embodiment. The electronic apparatus 1 includes a plurality of light emitting elements (LED) 3 arranged on a printed circuit board 2 in a housing 11 and a light pipe 20 that guides light from each light emitting element (LED) 3 to indicator lamps 15 arranged in a surface of the housing 11. A light emitting portion 23 is located in an irradiation window 12 formed in the housing 11 and functions as an indicator lamp 15.

The light pipe 20 includes a plurality of light guide units 21 and connection units 22 that connect together the light guide units 21 adjacent to each other. A light interference suppression hole 25 is formed in each connection unit 22.

The light guide unit 21 includes a light receiving surface 24 on a surface facing the LED 3 on the printed circuit board 2 and the light emitting portion 23 at an end portion opposite to the light receiving surface 24. The light pipe 20 further includes additional connection units 26 arranged around the light emitting portions 23 so that the connection units 26 detour around the light emitting portions 23. A light interference suppression hole 27 is formed in each connection unit 26.

The connection units 22 and 26 increase the mechanical strength and stability of the light pipe 20 and facilitate handling and assembling. In the example of FIGS. 2A and 2B, the light guide units 21 adjacent to each other are connected at two positions, which are a vicinity of the light receiving surface 24 and a vicinity of the light emitting portion 23. However, there may be at least one connection unit 22 or 26 between the light guide units 21 adjacent to each other according to the shape and the size of the light pipe 20.

Figure 3A:
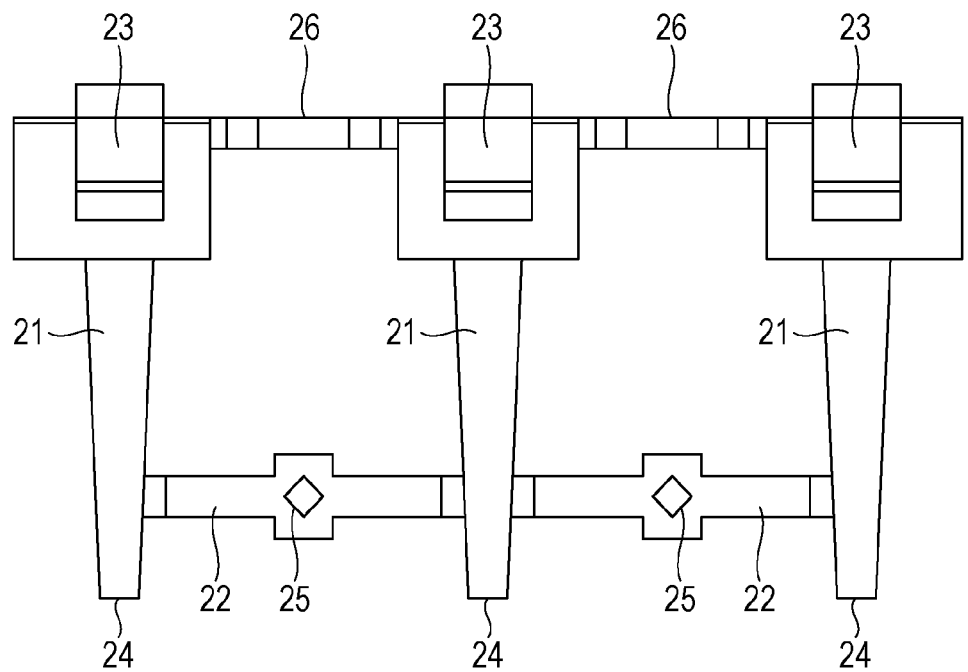
FIGS. 3A and 3B are front view and a top view of the light pipe in FIGS. 2A and 2B.
Figure 3B:
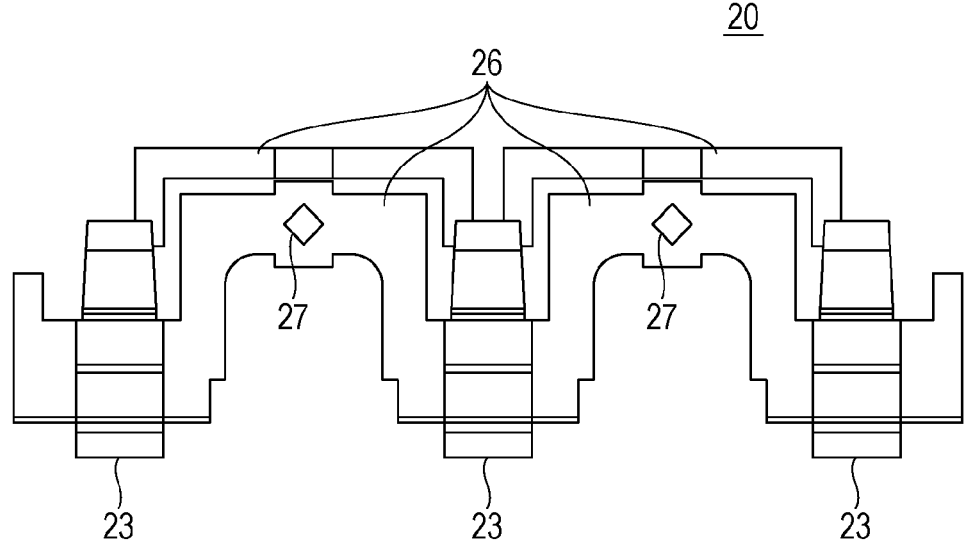

FIG. 3A is a front view of the light pipe 20. FIG. 3B is a top view of the light pipe 20. In this example, in the connection unit 22 in a lower portion (near the light receiving surface 24) of the light pipe 20, the light interference suppression hole 25 is formed in a surface perpendicular to a main surface of the printed circuit board 2 (see FIGS. 2A and 2B) on which the LEDs 3 are arranged. In the connection unit 26 in an upper portion (near the light emitting portion 23) of the light pipe 20, the light interference suppression hole 27 is formed in a surface in parallel with the main surface of the printed circuit board 2. The arrangements of the connection units 22 and 26 in which the light interference suppression holes 25 and 27 are formed are not limited to the example of FIGS. 3A and 3B, and in both connection units 22 and 26, the light interference suppression holes 25 and 27 may be formed in surfaces in parallel with the main surface of the printed circuit board 2, or in both connection units 22 and 26, the light interference suppression holes 25 and 27 may be formed in surfaces perpendicular to the main surface of the printed circuit board 2.

The light pipe 20 is integrally molded by, for example, a transparent resin such as polycarbonate, and the light interference suppression holes 25 and 27 may be formed during the molding. The light interference suppression holes 25 and 27 have an incidence surface that satisfies a total reflection condition in a light propagation direction as described later, so that the light interference suppression holes 25 and 27 reduces light interference between two light guide units 21 adjacent to each other.

Figure 4A:
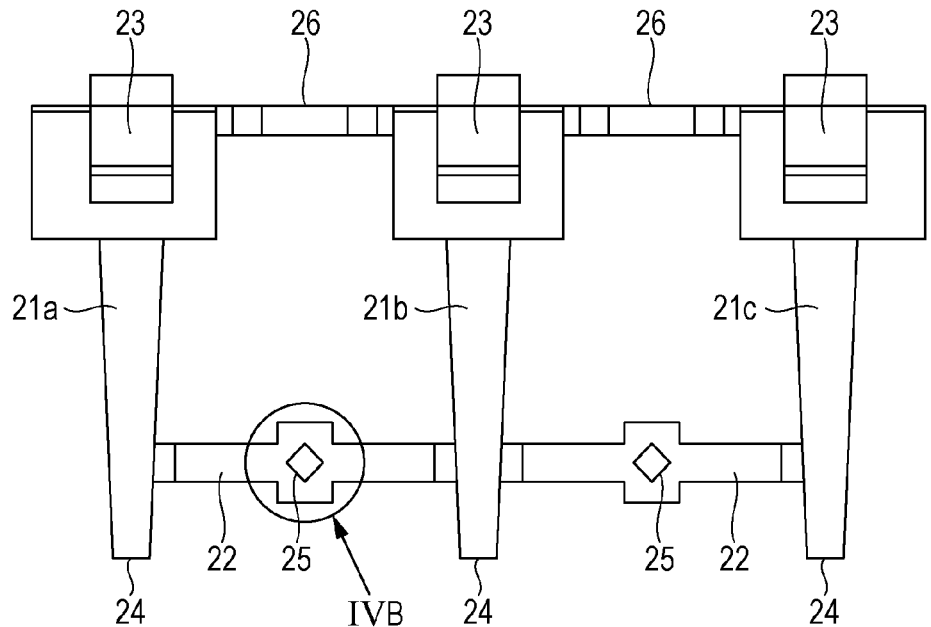
FIGS. 4A and 4B are diagrams illustrating a configuration example of a light interference suppression hole of the light pipe of the embodiment.
Figure 4B:
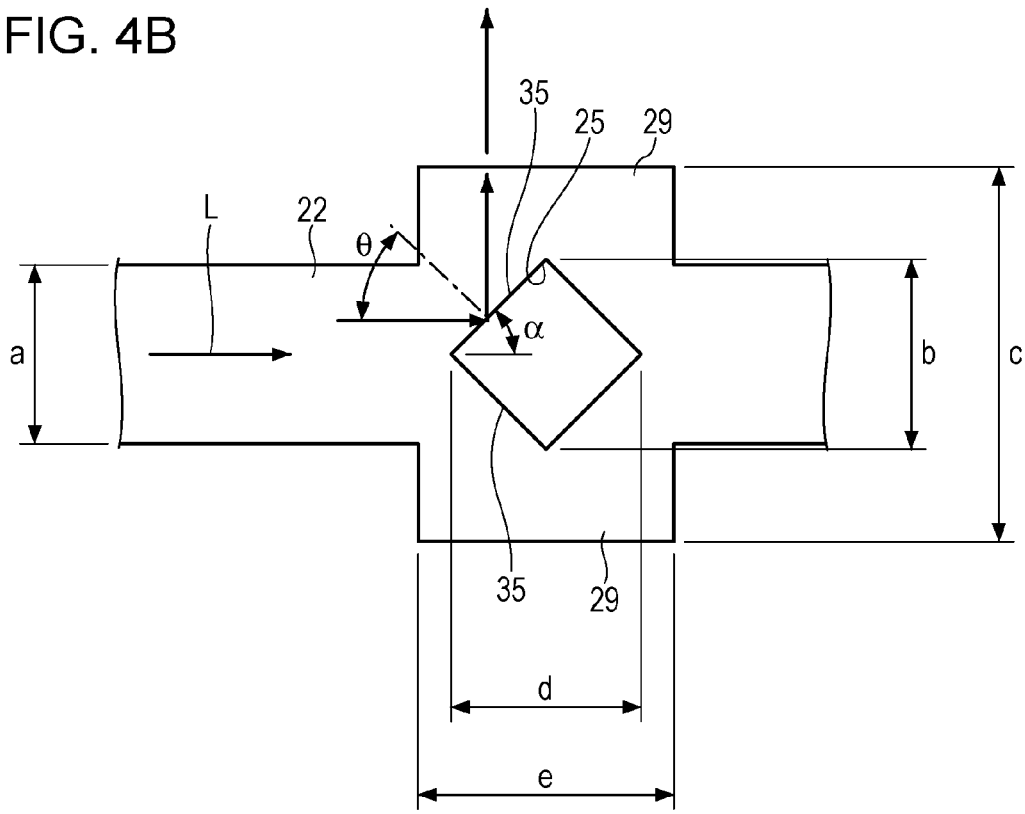

FIGS. 4A and 4B illustrate a configuration example of the light interference suppression hole 25. In this example, the light interference suppression hole 25 formed in the connection unit 22 is a diamond shaped hole. The light interference suppression hole 25 has an A surface 35 that satisfies a total reflection condition with respect to incident light at an interface between the connection unit 22 and the light interference suppression hole 25.

In FIGS. 4A and 4B, leakage light L propagates from a light guide unit 21a at left of the page to a light guide unit 21b on the right-hand side of the light guide unit 21a. Although, actually, the leakage light L propagates while reflecting in the connection unit 22, it is assumed that the leakage light L propagates along an axis in the longitudinal direction of the connection unit 22 as depicted by an arrow in FIG. 4B.

When the critical incident angle is $\theta 1$, the refractive index of air is n1, and the refractive index of the light pipe 20 is n2, from Snell's law, the total reflection condition of the leakage light L on the A surface 35 of the light interference suppression hole 25 is as described below.

$$\sin \theta 1 = n1/n2$$

$\theta 1 = \sin^{-1}(n1/n2)$ When the incident angle of the leakage light L from the connection unit 22 to the light interference suppression hole 25 is $\theta$, when a condition $\theta > \theta 1$ is satisfied, the leakage light L in FIG. 4B is totally reflected by the A surface 35.

When an angle formed by the A surface 35 of the light interference suppression hole 25 with respect to the axis in the longitudinal direction of the connection unit 22, that is, the light propagation axis, is $\alpha$, the condition $\theta > \theta 1$ is modified as described below because $\alpha$ and $\theta$ are complementary angles ($\theta = 90° - \alpha$).

$$90° - \alpha > \theta 1$$

$$\alpha < 90° - \theta 1 \tag{1}$$

Formula (1) defines the total reflection condition of the A surface 35 which is the interface between the connection unit 22 and the light interference suppression hole 25. It is possible to suppress interference to the adjacent light guide unit 21b by forming an interface (A surface) 35 that satisfies the total reflection condition of the incident light from the connection unit 22 in the light interference suppression hole 25.

To reliably suppress the interference to the adjacent light guide unit 21b, the size "b" of the light interference suppression hole 25 along the width direction of the connection unit 22 is set to greater than or equal to the width "a" of the connection unit 22.

$$a \leq b \tag{2}$$

Formula (2) is a condition to deter the leakage light L from detouring around the A surface 35 to the light guide unit 21b by defining a range of the size "b" of the light interference suppression hole 25. Therefore, the connection unit 25 has a wide hole forming area 29. The width c of the hole forming area 29 is wider than the width a of the connection unit 22.

Although, in the example of FIG. 4B, the size "d" of the light interference suppression hole 25 along the longitudinal direction of the connection unit 22 is set to smaller than the length "e" of the hole forming area 29, only a≤b has to be satisfied and d does not necessarily have to be smaller than or equal to e.

Although not illustrated in the drawings, the leakage light from the light guide unit 21b propagates from the right of the page of FIG. 4B and is totally reflected by the A surface 35 located at an interface on the side of the light guide unit 21b. The design angle $\alpha$ of the A surface 35 only has to satisfy Formula (1) of the total reflection condition, so that the light interference suppression hole 25 does not necessarily have to be bilaterally symmetric with respect to the optical axis or the axis in the longitudinal direction of the connection unit 22. Further, the light interference suppression hole 25 does not have to be bilaterally symmetric with respect to an axis perpendicular to the light in a surface of the connection unit 22.

In FIGS. 4A and 4B, the total reflection condition is described by using the connection unit 22 and the light interference suppression hole 25 in a lower portion of the light pipe 20. The same configuration as that illustrated in FIGS. 4A and 4B may be used for the connection unit 26 and the light interference suppression hole 27 in an upper portion of the light pipe 20. By the configuration illustrated in FIGS. 4A and 4B, it is possible to effectively suppress the light interference between the light guide units 21 adjacent to each other while securing easy handling even when not forming the light pipe 20 into a complex shape.

Figure 5A:
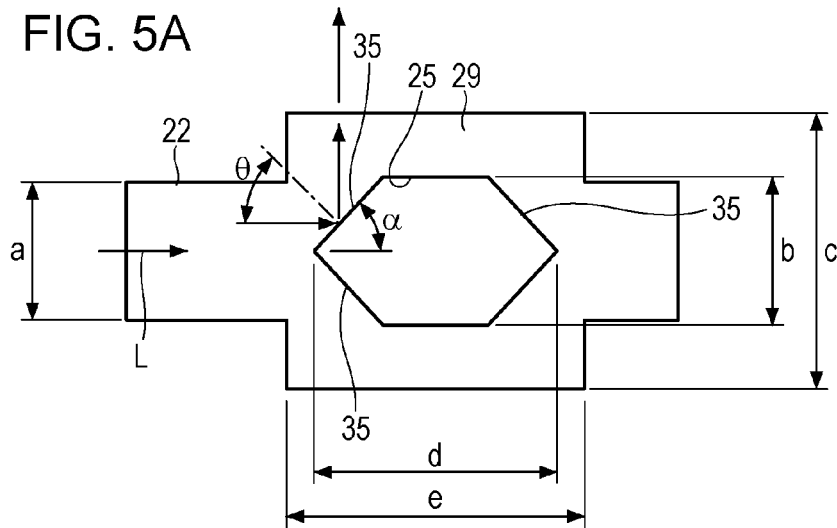
FIGS. 5A, 5B, and 5C are diagrams illustrating other configuration examples of the light interference suppression hole of the light pipe of the embodiment.
Figure 5B:
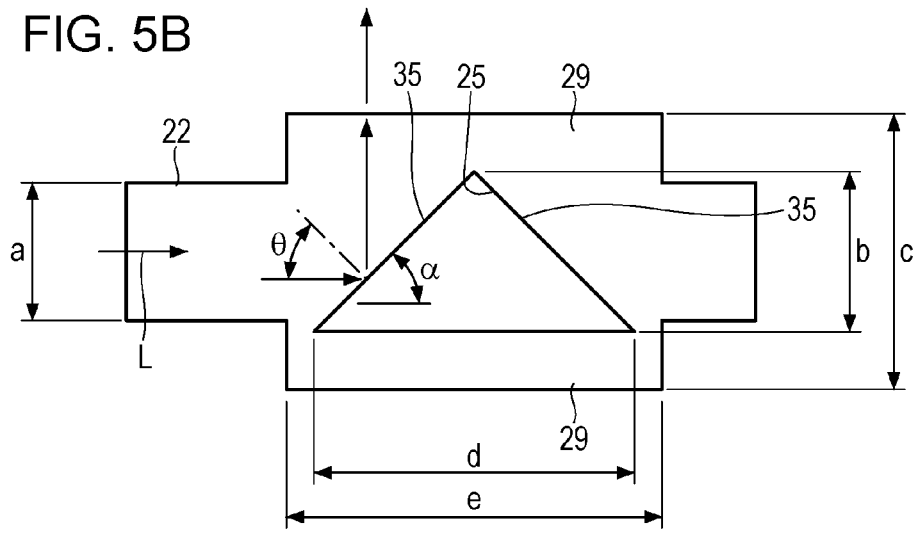
Figure 5C:
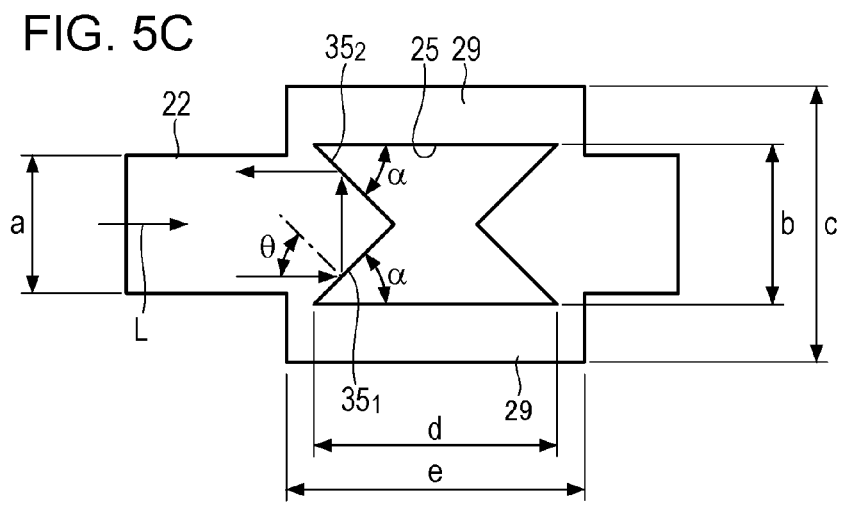

FIGS. 5A, 5B, and 5C illustrate other configuration examples of the light interference suppression hole 25. In FIG. 5A, a hexagonal light interference suppression hole 25 is formed in the connection unit 22.

When an angle formed by the A surface 35, which is an interface between the connection unit 22 and the light interference suppression hole 25, with respect to the axis in the longitudinal direction of the connection unit 22 (the light propagation axis) is α, Formula (1) below is satisfied in the same manner as in FIGS. 4A and 4B.

$$\alpha < 90° - \theta1 \quad (1)$$

The design angle α of the A surface 35, which is an incidence surface of the leakage light L, only has to satisfy the total reflection condition (1), so that the light interference suppression hole 25 does not necessarily have to be hexagonal and does not have to be bilaterally symmetric with respect to the light propagation axis.

When the width of the connection unit 22 is "a" and the size of the light interference suppression hole 25 along the width direction of the connection unit 22 is "b", the light interference suppression hole 25 is designed so as to satisfy the following formula.

$$a \leq b \quad (2)$$

In FIG. 5B, a triangular light interference suppression hole 25 is formed in the connection unit 22. When an angle formed by the A surface 35, which forms an oblique side of the triangle, with respect to the axis in the longitudinal direction of the connection unit 22 is α, the connection unit 22 and the light interference suppression hole 25 are designed so as to satisfy the following formula in the same manner as in FIGS. 4A and 4B.

$$\alpha < 90° - \theta1 \quad (1)$$

The design angle α of the A surface 35, which forms an oblique side of the triangle, only has to satisfy the total reflection condition (1), so that the light interference suppression hole 25 does not necessarily have to be an isosceles triangle or an equilateral triangle.

When the width of the connection unit 22 is "a" and the size of the light interference suppression hole 25 along the width direction of the connection unit 22 (in this case, the height of the triangle) is "b", the following formula is established.

$$a \leq b \quad (2)$$

In FIG. 5C, a concave polygonal light interference suppression hole 25 is formed in the connection unit 22. The leakage light L that enters the light interference suppression hole 25 from the light guide unit 21a is reflected twice by A surfaces $35_1$ and $35_2$ that form an interior angle greater than 180° (π) of the light interference suppression hole 25. Specifically, the leakage light L propagating in the connection unit 22 is totally reflected by the first A surface $35_1$ that satisfies the total reflection condition, and the totally reflected light is further totally reflected by the second A surface $35_2$ that satisfies the total reflection condition to return to the light guide unit 21a. This configuration does not allow the leakage light totally reflected in the light interference suppression hole 25 to escape to the outside of the connection unit 22, so that it is possible to further suppress the light interference between the light guide units 21 adjacent to each other. The size b of the light interference suppression hole 25 in the width direction is greater than the width a of the connection unit 22 (a≤b).

As described above, the shape of the light interference suppression hole 25 may be any polygonal shape if the light interference suppression hole 25 has a surface that satisfies the total reflection condition of the incident light propagating in the connection unit 22 (Formula (1)). Under this condition, it is approximated that the light propagation axis of the leakage light L is in parallel with the axis in the longitudinal direction of the connection unit 22. When size of the hole along the width direction of the connection unit 22 is greater than or equal to the width of the connection unit 22 (Formula (2)), it is possible to further improve the light interference suppression effect.

Figure 6A:
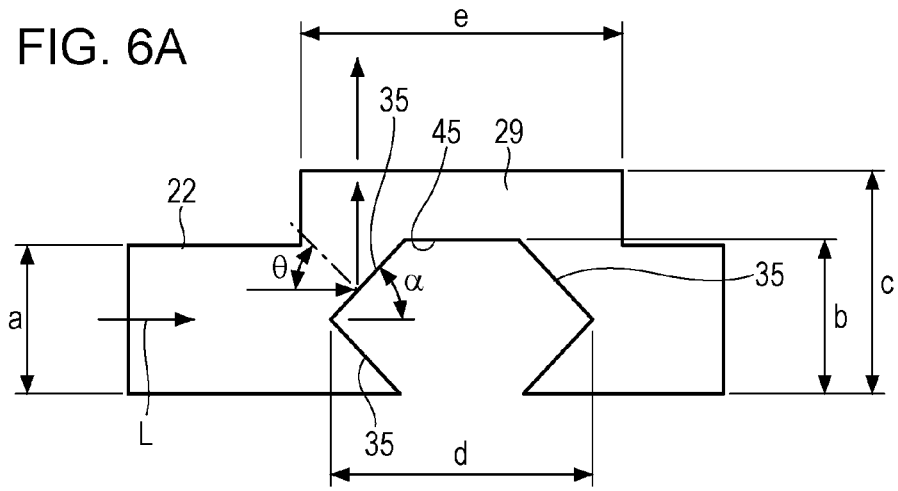
FIGS. 6A, 6B, and 6C are diagrams illustrating further other configuration examples of the light interference suppression hole of the light pipe of the embodiment.
Figure 6B:
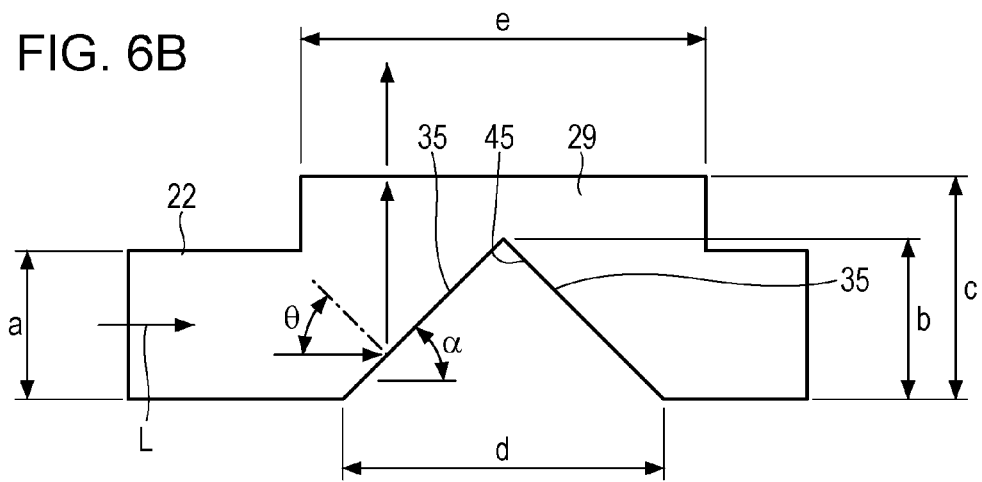
Figure 6C:
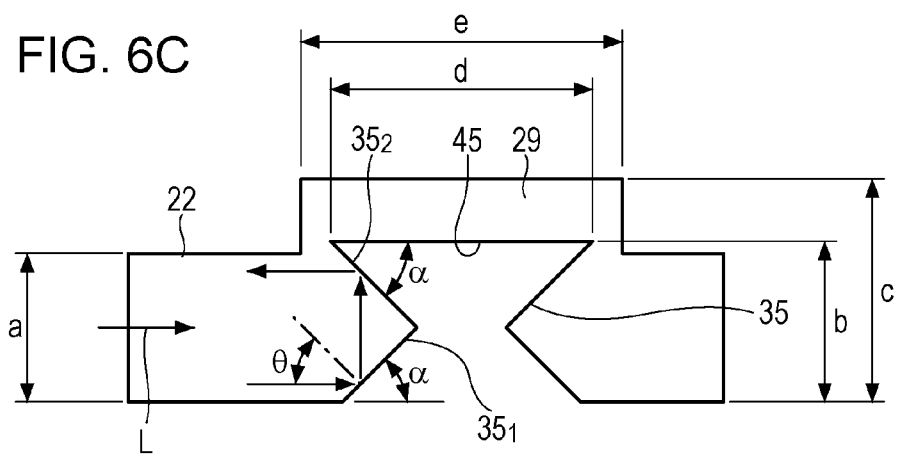

FIGS. 6A, 6B, and 6C illustrate further other configuration examples of the light interference suppression hole 25. In the examples of FIGS. 5A, 5B, and 5C, the light interference suppression hole 25 has a closed polygonal shape formed in the hole forming area 29 in the connection unit 22. However, in FIGS. 6A, 6B, and 6C, a light interference suppression hole 45 having an open polygonal shape is provided.

In FIG. 6A, one side of the hexagonal light interference suppression hole 45 is opened. The A surface 35 which is the incidence surface of the leakage light L satisfies the total reflection condition. The size "b" of the light interference suppression hole 45 along the width direction of the connection unit 22 is greater than or equal to the width "a" of the connection unit 22. Also in this configuration, the leakage light L from the light guide unit 21a or 21b is totally reflected by the A surface 35 and the light interference is suppressed.

In FIG. 6B, the base of the triangular light interference suppression hole 45 is opened. The A surface 35 which forms an oblique side of the triangle satisfies the total reflection condition. The size "b" of the height of the triangle is greater than or equal to the width "a" of the connection unit 22. Also in this configuration, the leakage light from the light guide unit 21a or 21b is totally reflected by the A surface 35 and the light interference is suppressed.

In FIG. 6C, one side of the concave polygonal light interference suppression hole 45 is opened. The leakage light L that propagates in the connection unit 22 is totally reflected by two A surfaces that form an interior angle greater than 180° (π) of the light interference suppression hole 45 and returns to the incident direction. The size "b" of the concave polygon along the width direction of the connection unit 22 is greater than or equal to the width "a" of the connection unit 22. The light interference between the light guide units 21 adjacent to each other is suppressed by this configuration.

Figure 7:
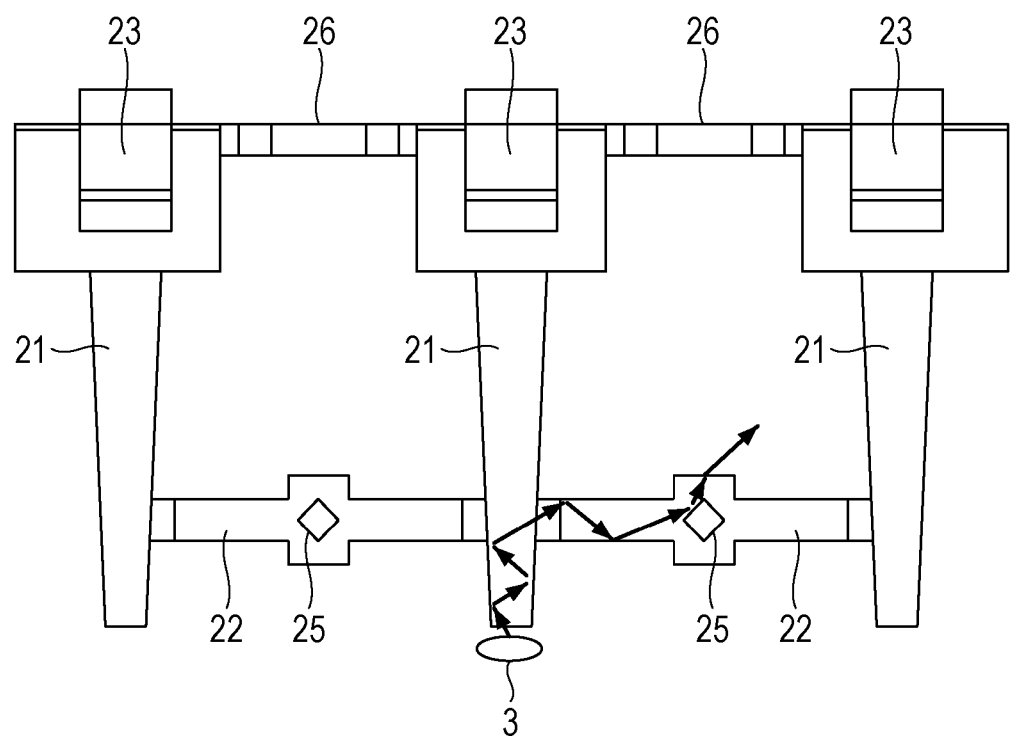
FIG. 7 is a diagram illustrating an effect of the light pipe of the embodiment.

FIG. 7 is a diagram illustrating the effect of the light pipe 20 of the embodiment. The light interference suppression hole 25 or the open light interference suppression hole 45 having the configurations illustrated in FIGS. 6A, 6B, and 6C is provided to the connection unit 22 of the light pipe 20, so that it is possible to deter the light from propagating to an adjacent light guide unit 21 and deter the light from emitting from an unintended light emitting portion 23.

The light interference suppression structure of the light pipe of the present application may be widely applied not only to a service gateway device and a server device, but also to electronic apparatuses including a plurality of lamp indicators.

Although the present embodiment has a configuration in which light is emitted from the irradiation window 12 arranged in the front surface $11_{front}$ of the housing 11, the irradiation window 12 may be formed in the top surface 11$_{top}$ and the light emitting portion 23 may be arranged to face the irradiation window 12 in the top surface 11$_{top}$. Also in this case, it is possible to suppress the light interference due to the leakage light and deter an unintended indicator lamp 15 from lighting by forming the light interference suppression hole 25 or 45 that satisfies Formula (1) in each of the connection units 22 (or 26) that connect a plurality of light guide units 21.

Although one side of the light interference suppression hole 45 is opened in the lower side of the connection unit 22 when the connection unit 22 is arranged vertically with respect to the main surface of the substrate 2 (see FIGS. 2A and 2B) in the embodiment illustrated in FIGS. 6A, 6B, and 6C, one side of the light interference suppression hole 45 may be opened in the upper side of the connection unit 22 as long as the mechanical strength of the light pipe 20 is not affected. Further, in the connection unit 26 arranged horizontally with respect to the main surface of the substrate 2, it is possible to provide the polygonal light interference suppression hole 45 in which one side is opened as illustrated in FIGS. 6A, 6B, and 6C.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A light pipe comprising:
   a plurality of light guides, each of the plurality of light guides including a light receiving surface at an end portion;
   a first connection formed between two light guides next to each other among the plurality of light guides, to couple the two light guides;
   a first light interference suppression hole formed in a surface of the first connection, that is perpendicular to the light receiving surface;
   a second connection formed between two light guides next to each other among the plurality of light guides, to couple the two light guides; and
   a second light interference suppression hole formed in a surface of the second connection, that is parallel to the light receiving surface, wherein
      the first light interference suppression hole includes a surface that satisfies a total reflection condition of light entering the first light interference suppression hole from the first connection, and
      the second light interference suppression hole includes a surface that satisfies a total reflection condition of light entering the second light interference suppression hole from the second connection.

2. The light pipe according to claim 1,
   wherein the first light interference suppression hole is a polygonal hole.

3. The light pipe according to claim 1,
   wherein the first light interference suppression hole is a concave polygonal hole and has a first total reflection surface that totally reflects the light and a second total reflection surface that further totally reflects the light totally reflected by the first total reflection surface on an incident side of the light.

4. The light pipe according to claim 1,
   wherein the first light interference suppression hole is a closed polygonal hole formed in the first connection.

5. The light pipe according to claim 1,
   wherein the first light interference suppression hole is a polygonal hole which is formed in the first connection and in which one side is opened.

6. The light pipe according to claim 1,
   wherein when a width of a portion of the first connection is A and a width of the first light interference suppression hole along a direction of the width of the portion of the first connection is B, A≤B is satisfied.

7. The light pipe according to claim 1,
   wherein the light pipe is integrally formed of a transparent resin.

8. The light pipe according to claim 1, wherein the first connection includes a projection portion near the first light interference suppression hole, the projection portion having a width which is wider in a direction extending along the first connection than a width of the first light interference suppression hole in the direction extending along the first connection.

9. The light pipe according to claim 1, wherein the axis along the longitudinal direction of the first connection is a light propagation axis.

10. An electronic apparatus comprising:
    a plurality of light emitting elements arranged in a housing;
    a plurality of indicator lamps arranged in a surface of the housing, each of the indicator lamps corresponding to a respective one of the light emitting elements; and
    a light pipe that guides light from the light emitting elements to the indicator lamps, respectively, the light pipe including,
       a plurality of light guides, each of the plurality of light guides corresponding to a respective one of the light emitting elements, and including a light receiving surface at an end portion,
    a first connection formed between two light guides next to each other among the plurality of light guides, to couple the two light guides;
    a first light interference suppression hole formed in a surface of the first connection, that is perpendicular to the light receiving surface;
    a second connection formed between two light guides next to each other among the plurality of light guides, to couple the two light guides; and
    a second light interference suppression hole formed in a surface of the second connection, that is parallel to the light receiving surface, wherein
       the first light interference suppression hole includes a surface that satisfies a total reflection condition of light entering the first light interference suppression hole from the first connection, and
       the second light interference suppression hole includes a surface that satisfies a total reflection condition of light entering the second light interference suppression hole from the second connection.

11. The electronic apparatus according to claim 10,
    wherein each of the light guides includes a light emitting portion which is located at another end portion opposite to the light receiving surface and forms a part of the indicator lamp.

12. The electronic apparatus according to claim 10,
wherein the light emitting elements are provided on a substrate arranged in the housing, and
the surface in which the first light interference suppression hole is formed in the first connection is perpendicular to a main surface of a substrate.

13. The electronic apparatus according to claim 10,
wherein the light emitting elements are provided on a substrate arranged in the housing, and
the surface in which the second light interference suppression hole is formed in the second connection is parallel to a main surface of the substrate.

14. The electronic apparatus according to claim 10,
wherein the indicator lamps are arranged in at least one of a front surface and a top surface of the housing.

15. The electronic apparatus according to claim 10, wherein the first connection includes a projection portion near the first light interference suppression hole, the projection portion having a width which is wider in a direction extending along the first connection than a width of the first light interference suppression hole in the direction extending along the first connection.

16. The electronic apparatus according to claim 10, wherein the axis along the longitudinal direction of the first connection is a light propagation axis.

* * * * *